United States Patent
Kai et al.

(10) Patent No.: US 8,673,250 B2
(45) Date of Patent: Mar. 18, 2014

(54) EXHAUST GAS PURIFICATION CATALYST AND PRODUCTION METHOD THEREFOR, AND METHOD FOR PURIFYING NITROGEN OXIDE IN EXHAUST GAS

(75) Inventors: Keiichiro Kai, Hiroshima (JP); Yasuyoshi Kato, Hiroshima (JP); Naomi Imada, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/814,523

(22) PCT Filed: Aug. 4, 2011

(86) PCT No.: PCT/JP2011/004420
§ 371 (c)(1),
(2), (4) Date: Feb. 6, 2013

(87) PCT Pub. No.: WO2012/020557
PCT Pub. Date: Feb. 16, 2012

(65) Prior Publication Data
US 2013/0142719 A1 Jun. 6, 2013

(30) Foreign Application Priority Data
Aug. 9, 2010 (JP) .................. 2010-179055

(51) Int. Cl.
*B01D 53/56* (2006.01)
*B01J 21/06* (2006.01)
*B01J 21/02* (2006.01)
*B01J 23/22* (2006.01)
*B01J 23/28* (2006.01)
*B01J 37/00* (2006.01)

(52) U.S. Cl.
USPC ........ 423/239.1; 502/217; 502/305; 502/350; 502/353; 502/439; 502/514

(58) Field of Classification Search
USPC ............... 423/239.1; 502/217, 305, 350, 353, 502/439, 514
See application file for complete search history.

(56) References Cited

U.S. PATENT DOCUMENTS

| 4,119,568 A | * | 10/1978 | Nishida et al. | 502/208 |
| 4,160,744 A | * | 7/1979 | Watanabe et al. | 502/217 |
| 4,865,827 A | * | 9/1989 | Tachi et al. | 423/239.1 |
| 4,952,548 A | * | 8/1990 | Kato et al. | 502/217 |

FOREIGN PATENT DOCUMENTS

| JP | 1-245852 A | * | 10/1989 | B01J 27/053 |
| JP | 1-317545 A | * | 12/1989 | B01J 27/053 |
| JP | 08-168641 A | * | 7/1996 | B01D 53/56 |
| JP | 2003/93881 A | * | 4/2003 | B01J 27/053 |
| JP | 2011-161364 A | * | 8/2011 | B01J 27/199 |

* cited by examiner

*Primary Examiner* — Timothy Vanoy
(74) *Attorney, Agent, or Firm* — Heslin Rothenberg Farley & Mesiti P.C.

(57) ABSTRACT

An exhaust gas purification catalyst is made as a composition comprising titanium oxide ($TiO_2$), aluminum sulfate ($Al_2(SO_4)_3$), an oxide of vanadium (V), and an oxide of molybdenum (Mo) and/or tungsten (W), wherein on titanium oxide having sulfate ions and aluminum ions adsorbed thereon obtained by making contact with aluminum sulfate at more than 1 wt % and not more than 6 wt % relative to titanium oxide in the presence of water, an oxo acid salt of vanadium or a vanadyl salt and an oxo acid or an oxo acid salt of molybdenum and/or tungsten are supported in a proportion of more than 0 atom % and not more than 3 atom %, respectively. By this, the degradation of catalyst performance can be suppressed even with exhaust gas containing potassium compounds at a high concentration in combustion ash.

3 Claims, No Drawings

EXHAUST GAS PURIFICATION CATALYST AND PRODUCTION METHOD THEREFOR, AND METHOD FOR PURIFYING NITROGEN OXIDE IN EXHAUST GAS

CROSS REFERENCE TO RELATED APPLICATIONS

This application is a national stage filing under section 371 of International Application No. PCT/JP2011/004420, filed on Aug. 4, 2011, and published in Japanese on Feb. 16, 2012, as WO 2012/020557 and claims priority of Japanese application No. 2010-179055 filed on Aug. 9, 2010, the entire disclosure of these applications being hereby incorporated herein by reference.

TECHNICAL FIELD

The present invention relates to an exhaust gas purification catalyst for preventing the degradation of catalyst performance caused by potassium compounds contained in exhaust gas of biomass combustion, and a production method therefor, as well as a method for purifying nitrogen oxides in exhaust gas.

BACKGROUND ART

Currently, a decrease in $CO_2$ emission is an urgent problem in order to prevent global warming caused by an increase in carbon dioxide (hereinafter, referred to as $CO_2$) concentration in the atmosphere. As measures for decreasing $CO_2$ emission, a decrease in the consumption of fossil fuels through energy saving, measures to be taken in the use of fossil fuels such as the recovery and isolation of $CO_2$ in combustion exhaust gas, and utilization of natural energy such as solar cells and wind power generation, and the like have been promoted. In addition to these, electricity generation by biomass fuels has attracted attention as a method not leading to an increase in $CO_2$. It has started to be adopted in the form of mono-fuel combustion of biomass or in the form of multi-fuel combustion of biomass and fossil fuel particularly in the areas centering on the regions Europe.

By the way, combustion exhaust gases contain nitrogen oxides, and catalysts are used to remove those nitrogen oxides. As a conventional example using such a catalyst, a method is known in which, in the presence of ammonia, exhaust gas is made into contact with a catalyst containing titanium oxide, active ingredients for reaction of removing nitrogen oxides, and metal sulfate having crystallization water (for example, see Patent Literature 1). Also, a method is known in which sulfate ions are adsorbed onto titanium oxide in order to enhance the activation of denitrification catalyst (for example, see Patent Literature 2).

Also, combustion gases of biomass fuel contain a deliquescent potassium carbonate, and this deliquesces to become a liquid state at a low temperature, and then, permeates pores in a denitrification catalyst, resulting in a modification of active sites in the catalyst (for example, see Patent Literature 3).

CITATION LIST

Patent Literature

Patent Literature 1: JP-A-63-291628
Patent Literature 2: JP-A-1-15137
Patent Literature 3: International Publication No. WO99/02262

SUMMARY OF INVENTION

Technical Problem

For exhaust gas of biomass combustion, a problem is that combustion ash of plant derived fuels, such as wood chips and peat, contains a large quantity of deliquescent potassium carbonate, and thus, the performance of catalysts for denitrificating exhaust gas is rapidly degraded.

An object of the present invention is to provide an exhaust gas purification catalyst that undergoes small performance degradation due to exhaust gas containing potassium compounds at a high concentration in combustion ash, and a production method therefor, as well as a method for purifying nitrogen oxides in exhaust gas.

Solution to Problem

An exhaust gas purification catalyst according to the present invention is a composition comprising titanium oxide ($TiO_2$), aluminum sulfate ($Al_2(SO_4)_3$), and an oxide of vanadium (V) and an oxide of molybdenum (Mo) and/or tungsten (W), and is characterized in that on titanium oxide having sulfate ions and aluminum ions adsorbed thereon obtained by making contact with aluminum sulfate at more than 1 wt % and not more than 6 wt % relative to titanium oxide in the presence of water, an oxo acid salt of vanadium or a vanadyl salt and an oxo acid or an oxo acid salt of molybdenum and/or tungsten are supported in a proportion of more than 0 atom % and not more than 3 atom %, respectively.

Also, a production method for an exhaust gas purification catalyst according to the present invention is a production method for an exhaust gas purification catalyst comprising titanium oxide ($TiO_2$), aluminum sulfate ($Al_2(SO_4)_3$), an oxide of vanadium (V), and an oxide of molybdenum (Mo) and/or tungsten (W), and is characterized by comprising supporting an oxo acid salt of vanadium or a vanadyl salt and an oxo acid or an oxo acid salt of molybdenum and/or tungsten in a proportion of more than 0 atom % and not more than 3 atom %, respectively, onto titanium oxide having sulfate ions and aluminum ions adsorbed thereon obtained by making contact with aluminum sulfate at more than 1 wt % and not more than 6 wt % relative to titanium oxide in the presence of water.

Moreover, a method for purifying nitrogen oxides in exhaust gas according to the present invention is characterized by injecting ammonia ($NH_3$) as a reducing agent into the exhaust gas from mono-fuel combustion of biomass or multi-fuel combustion of biomass and coal, followed by contacting this exhaust gas with the exhaust gas purification catalyst of the present invention to reduce and remove nitrogen oxides contained in the exhaust gas.

The present inventors have investigated the process of poisoning of denitrification catalyst by potassium compounds contained in biomass combustion ash in detail. As a result, the present inventors have found that most of potassium compounds attached on the catalyst are present as carbonate salts, that potassium compounds attached on the catalyst deliquesce to permeate into the catalyst when the catalyst is exposed to a highly wet condition while stopped operation of a denitrification device, and that potassium compounds are adsorbed onto adsorption sites of ammonia existing on titanium oxide to inhibit the adsorption of ammonia, resulting in deactivation of the catalytic activity, and thus, have accomplished the present invention.

Ammonia, which is a reducing agent used in denitrification reaction, is adsorbed onto an OH group, an acid point on titanium oxide as shown in "Formula 1". On the other hand, a potassium ion in potassium carbonate which has entered the catalyst is also adsorbed onto an OH group as shown in "Formula 2" to inhibit the absorption of ammonia, because the adsorption capability of a potassium ion is greater than the adsorption capability of ammonia. This is the cause of deactivation of a denitrification catalyst by potassium, and results in a rapid drop of the denitrification rate of a denitrification catalyst in exhaust gas during biomass combustion.

$$NH_3 + HO-Ti\text{-(active site on } TiO_2) \rightarrow NH_4-O-Ti- \quad \text{(Formula 1)}$$

$$\tfrac{1}{2}K_2CO_3 + HO-Ti\text{-(active site on } TiO_2) \rightarrow K-O-Ti-+\tfrac{1}{2}H_2O+\tfrac{1}{2}CO_2 \quad \text{(Formula 2)}$$

In contrast to this, a catalyst according to the present invention is characterized in that titanium oxide ($TiO_2$) is premixed with aluminum sulfate ($Al_2(SO_4)_3$) in the presence of water to allow sulfate ions adsorbed onto a portion of active sites of titanium oxide. With this, most of the potassium ions which have entered the catalyst firstly react with sulfate ions, which are stronger acids than OH groups on the surface of titanium oxide (Formula 3, Formula 4), and as a result, OH groups are produced on titanium oxide, and these OH groups become the adsorption site of ammonia ($NH_3$). By means of this, the decrease in adsorption sites in ammonia due to the reaction of potassium compounds and OH groups (Formula 2) can be prevented, and thus, the rate of degradation of catalyst performance by the potassium compounds can be dramatically lowered. Moreover, aluminum sulfate has a relatively higher decomposition temperature than other sulfates. Thus, at a gas temperature around 350 to 400° C., which will be a practical operating condition for a catalyst, aluminum ions play a role to steadily hold sulfate ions adsorbed onto OH groups on titanium oxide. For this reason, the catalyst according to the present invention can maintain durability against potassium compounds over a long period of time.

$$Al_2(SO_4)_3 + 6(HO-Ti-) \rightarrow 3SO_4(-Ti-)_2 + 2Al(OH)_3 \quad \text{(Formula 3)}$$

$$3K_2CO_3 + 3SO_4(-Ti-)_2 + 3H_2O \rightarrow 3K_2SO_4 + 6(HO-Ti-) + 3CO_2 \quad \text{(Formula 4)}$$

Also, when sulfate ions are adsorbed onto OH groups on titanium oxide, OH groups adjacent to sulfate radicals become superstrong acid points due to electron withdrawing effect of sulfate radicals, leading to promoting the adsorption of ammonia. Thus, by means of allowing sulfate ions to be adsorbed onto titanium oxide, the denitrification performance of catalyst can be enhanced.

Advantageous Effects of Invention

According to the present invention, an exhaust gas purification catalyst undergoing a small performance degradation even in exhaust gas containing potassium compounds at a high concentration in combustion ash can be achieved. Also, according to the present invention, high denitrification performance can be maintained in exhaust gas of biomass combustion over a long period of time.

DESCRIPTION OF EMBODIMENT

Hereinafter, Examples of the present invention will be described.

The present invention is intended to ensure high initial performance and durability of a catalyst, and also to significantly reduce the consumption amount of molybdenum or tungsten, by means of replacing a portion of molybdenum (Mo) or tungsten (W), which is a rare metal, with sulfates.

Namely, in an exhaust gas purification catalyst according to the present invention, on titanium oxide ($TiO_2$) having sulfate ions and aluminum ions adsorbed thereon obtained by making contact with aluminum sulfate (($Al_2(SO_4)_3$)) at more than 1 wt % and not more than 6 wt % relative to titanium oxide in the presence of water, an oxo acid salt of vanadium (V) or a vanadyl salt and an oxo acid or an oxo acid salt of molybdenum (Mo) and/or tungsten (W) are supported in a proportion of more than 0 atom % and not more than 3 atom %, respectively.

Also, a production method for an exhaust gas purification catalyst according to the present invention includes supporting an oxo acid salt of vanadium (V) or a vanadyl salt and an oxo acid or an oxo acid salt of molybdenum (Mo) and/or tungsten (W) in a proportion of more than 0 atom % and not more than 3 atom %, respectively, onto titanium oxide having sulfate ions and aluminum ions adsorbed thereon obtained by making contact with aluminum sulfate (($Al_2(SO_4)_3$)) at more than 1 wt % and not more than 6 wt % relative to titanium oxide ($TiO_2$) in the presence of water.

Moreover, a method for purifying nitrogen oxides in exhaust gas according to the present invention includes injecting ammonia ($NH_3$) as a reducing agent into exhaust gas from mono-fuel combustion of biomass or multi-fuel combustion of biomass and coal, followed by contacting this exhaust gas with an exhaust gas purification catalyst of the present invention to reduce and remove nitrogen oxides contained in the exhaust gas.

The amount of sulfate ions that can be steadily adsorbed onto titanium oxide ($TiO_2$) are about 1 to 5 wt % in the case of titanium oxide raw materials generally used and having a specific surface area of about 100 to 300 m²/g, and if the amount is greater than the range, there remains no OH group onto which ammonia ($NH_3$) can be adsorbed, resulting in a large decrease in activity. Thus, the amount of aluminum sulfate ($Al_2(SO_4)_3$) added is not more than 6 wt %, and desirably is not more than 4.5 wt %; however it depends on the type of raw materials for titanium oxide. In this way, high durability can be provided without affecting denitrification activity, likely leading to good results. Also, the amount of aluminum sulfate added has no particular limitation for its lower side; however, it is desirable to carry not less than 1 wt % of aluminum sulfate relative to titanium oxide, in order to provide a significant durability against potassium compounds and activity enhancement effects by sulfate radicals.

As active ingredients to be added to titanium oxide onto which sulfate ions are adsorbed, an oxo acid salt of vanadium (V) or a vanadyl salt as well as an oxo acid or an oxo acid salt of molybdenum (Mo) and/or tungsten (W) can be used, and there is no limitation in terms of the amounts to be added; however, the amount to be added is selected in a proportion of more than 0 atom % and not more than 3 atom % relative to titanium oxide for the respective ingredients. It is advantageous to select a large value for titanium oxide raw material having a large specific surface area and a small value for titanium oxide raw material having a small specific surface area, because high denitrification performance can be maintain and also oxidizing performance of $SO_2$ can be suppress to a low level.

Although any method can be used as the method of adding these active ingredients, a method in which kneading or kneading under heating is conducted with a kneader in the presence of water is economical and excellent.

A catalytic component after active ingredients have been supported is formed into a honeycomb-like shape by a known method and then used, and alternatively, can be used as a laminate structure of plate-like objects obtained by applying the catalytic component to a metal substrate that is made from stainless-steel and is processed into a net-like shape, or to a net-like object of ceramic fibers, followed by forming a spacer portion thereof into wave-like shape or the like. In particular, when the catalyst body is used in the form of plate as in the latter case, ash containing potassium compounds have little tendency to accumulate between the catalysts, and thus, good results are likely to be obtained.

Hereinafter, the respective Examples of the present invention and Comparative Examples relative to these respective Examples will be described.

Example 1

900 g of titanium oxide ($TiO_2$: made by Ishihara Sangyo Ltd., specific surface area 290 $m^2$/g), 70.4 g of aluminum sulfate ($Al_2(SO_4)_3$) 13 to 14 hydrates, 396 g of 20 wt % silica sol (made by Nissan Chemical Industries, Ltd., OS sol), and 100 g of water were added into a kneader and kneaded for 30 minutes, allowing for sulfate ions to be adsorbed onto the surface of titanium oxide.

Also, 17.0 g of molybdenum trioxide and 41.5 g of ammonium metavanadate were added to titanium oxide onto which sulfate ions were adsorbed, and kneaded in the kneader for further 1 hour so as to carry a compound of molybdenum (Mo) and vanadium (V).

Moreover, kneading was conducted in the kneader for 20 minutes, with gradually adding 149 g of silica alumina base ceramic fibers (Toshiba finelex), to obtain a homogeneous paste-like object. The obtained paste-like object was placed on a substrate having a thickness of 0.7 mm and manufactured by metal-lath processing of a sheet steel having thickness of 0.2 mm and made from SUS 430, and then, this was sandwiched between two pieces of polyethylene sheets, passed through a pair of pressure rollers, and applied so as to fill up the mesh of the metal-lath substrate.

Then, the object to which the paste-like object was applied was dried, and burned at 450° C. for 2 hours to obtain a catalyst. The composition of this catalyst is Ti/Mo/V=96/1/3 in atom ratio, and the amount of aluminum sulfate ($Al_2(SO_4)_3$) 13 to 14 hydrates added is 4.5 wt % relative to titanium oxide ($TiO_2$).

Example 2

A catalyst was prepared in the same manner as in Example 1, except that the amount of aluminum sulfate ($Al_2(SO_4)_3$) 13 to 14 hydrates added in Example 1 was changed to 23.5 g. The amount of aluminum sulfate ($Al_2(SO_4)_3$) 13 to 14 hydrates added in this case is 1.5 wt % relative to titanium oxide ($TiO_2$). Note that the composition of this catalyst is Ti/Mo/V=96/1/3 in atom ratio, as in Example 1.

Example 3

A catalyst was prepared in the same manner as in Example 1, except that the amount of aluminum sulfate ($Al_2(SO_4)_3$) 13 to 14 hydrates added in Example 1 was changed to 47.0 g. The amount of aluminum sulfate ($Al_2(SO_4)_3$) 13 to 14 hydrates added in this case is 3.0 wt % relative to titanium oxide ($TiO_2$). Note that the composition of this catalyst is Ti/Mo/V=96/1/3 in atom ratio, as in Example 1.

Example 4

A catalyst was prepared in the same manner as in Example 1, except that the amount of aluminum sulfate ($Al_2(SO_4)_3$) 13 to 14 hydrates added in Example 1 was changed to 93.9 g. The amount of aluminum sulfate ($Al_2(SO_4)_3$) 13 to 14 hydrates added in this case is 6.0 wt % relative to titanium oxide ($TiO_2$). Note that the composition of this catalyst is Ti/Mo/V=96/1/3 in atom ratio, as in Example 1.

Example 5

A catalyst was prepared in the same manner as in Example 1, except that the amount of ammonium metavanadate added in Example 1 was changed to 6.7 g. The composition of this catalyst is Ti/Mo/V=98.5/1/0.5 in atom ratio, and the amount of aluminum sulfate ($Al_2(SO_4)_3$) 13 to 14 hydrates added is 4.5 wt % relative to titanium oxide ($TiO_2$).

Example 6

A catalyst was prepared in the same manner as in Example 1, except that the amount of ammonium metavanadate added in Example 1 was changed to 13.3 g. The composition of this catalyst is Ti/Mo/V=98/1/1 in atom ratio, and the amount of aluminum sulfate ($Al_2(SO_4)_3$) 13 to 14 hydrates added is 4.5 wt % relative to titanium oxide ($TiO_2$).

Example 7

A catalyst was prepared in the same manner as in Example 1, except that the amount of molybdenum trioxide added in Example 1 was changed to 51.7 g. The composition of this catalyst is Ti/Mo/V=94/3/3 in atom ratio, and the amount of aluminum sulfate ($Al_2(SO_4)_3$) 13 to 14 hydrates added is 4.5 wt % relative to titanium oxide ($TiO_2$).

Example 8

A catalyst was prepared in the same manner as in Example 1, except that 17.0 g of molybdenum trioxide used in Example 1 was changed to 24.4 g of ammonium metatungstate. The composition of this catalyst is Ti/W/V=96/1/3 in atom ratio, and the amount of aluminum sulfate ($Al_2(SO_4)_3$) 13 to 14 hydrates added is 4.5 wt % relative to titanium oxide ($TiO_2$).

Comparative Example 1

A catalyst was prepared in the same manner as in Example 1, except that aluminum sulfate ($Al_2(SO_4)_3$) 13 to 14 hydrates was not added in Example 1.

Comparative Example 2

A catalyst was prepared in the same manner as in Example 1, except that aluminum sulfate ($Al_2(SO_4)_3$) 13 to 14 hydrates was not added in Example 5.

Comparative Example 3

A catalyst was prepared in the same manner as in Example 1, except that aluminum sulfate ($Al_2(SO_4)_3$) 13 to 14 hydrates was not added in Example 6.

Comparative Example 4

A catalyst was prepared in the same manner as in Example 1, except that aluminum sulfate ($Al_2(SO_4)_3$) 13 to 14 hydrates was not added in Example 7.

Comparative Example 5

A catalyst was prepared in the same manner as in Example 1, except that aluminum sulfate ($Al_2(SO_4)_3$) 13 to 14 hydrates was not added in Example 8.

Comparative Example 6

A catalyst was prepared by initially mixing titanium oxide ($TiO_2$) with aluminum sulfate ($Al_2(SO_4)_3$) 13 to 14 hydrates, molybdenum trioxide, ammonium metavanadate, silica sol, and water at the same time, kneading in a kneader for 90 minutes, and conducting subsequent treatments in the same manner as in Example 1.

Now, Examples are compared to Comparative Examples.

The respective catalysts prepared in Examples 1 to 8 and in Comparative Examples 1 to 6 were cut out with 20 mm width×100 mm length, and in order to simulate a degradation by potassium compounds contained in biomass combustion ash, a catalytic component was impregnated in an aqueous solution of potassium carbonate so that $K_2O$ was added at 0.5 wt % to the catalytic component, and then was dried at 150° C. Then, three pieces of the catalyst after the simulation test and three pieces of the catalyst before the simulation test were used to determine denitrification performances under the conditions in Table 1 (conditions in terms of the composition of gas, the flow rate of gas, temperature, and catalyst load), and poison resistances against potassium degradation of the respective catalysts were evaluated.

TABLE 1

| Subject | Value |
| --- | --- |
| 1. Composition of gas | |
| NOx | 200 ppm |
| NH$_3$ | 240 ppm |
| SO$_2$ | 500 ppm |
| O$_2$ | 3% |
| CO$_2$ | 12% |
| H$_2$O | 12% |
| 2. Flow rate of gas | 3.7 litter/minute |
| 3. Temperature | 350° C. |
| 4. Catalyst load | 20 mm width × 100 mm (total length) – three pieces |

The evaluation results are summarized in Table 2.

TABLE 2

| Catalyst | Initial denitrification rate (%) | Denitrification rate after degradation test using potassium (%) |
| --- | --- | --- |
| Example 1 | 98.5 | 97.9 |
| Example 2 | 98.0 | 92.3 |
| Example 3 | 98.2 | 97.8 |
| Example 4 | 97.7 | 97.0 |
| Example 5 | 95.6 | 85.4 |
| Example 6 | 96.5 | 95.1 |
| Example 7 | 98.1 | 97.0 |
| Example 8 | 97.5 | 96.3 |
| Comparative Example 1 | 98.2 | 70.1 |
| Comparative Example 2 | 94.0 | 60.5 |
| Comparative Example 3 | 95.5 | 63.5 |
| Comparative Example 4 | 98.5 | 72.0 |
| Comparative Example 5 | 97.0 | 65.5 |
| Comparative Example 6 | 98.2 | 94.5 |

As can be seen in Table 2, the catalysts prepared in Examples 1 to 8 exhibited a small reduction in their denitrification performances (denitrification rate) between before and after the simulation tests; on the other hand, except for Comparative Example 6, the catalysts prepared in Comparative Examples 1 to 5 exhibited a large reduction in their denitrification performances (denitrification rate) between before and after the simulation tests. In this manner, the respective catalysts prepared in Examples 1 to 8 can significantly reduce the degradation by potassium compounds, and by means of this, the high performance of a denitrification device for biomass-combustion exhaust gas can be maintained over a long period of time. As a result, the frequency of catalyst replacement can be significantly reduced, enabling a remarkable reduction in the operating cost of denitrification device.

Hereinabove, Examples of the present invention have been described in detail; however, the respective Examples described above are only the illustrations of the present invention, and the present invention is not limited only to the structures of the respective Examples above. Even if design changes and the like are made in the range not departing from the gist of the present invention, they are included in the present invention, of course.

For example, the present invention includes a catalyst in which the amount of aluminum sulfate added is in the range of more than 1 wt % and not more than 6 wt % relative to titanium oxide, and an oxo acid salt of vanadium or a vanadyl salt and an oxo acid or an oxo acid salt of molybdenum and/or tungsten are supported in a proportion of more than 0 atom % and not more than 3 atom % on titanium oxide having sulfate ions and aluminum ions adsorbed thereon carries.

The invention claimed is:

1. An exhaust gas purification catalyst having a composition comprising:
   titanium oxide ($TiO_2$);
   aluminum sulfate ($Al_2(SO_4)_3$);
   an oxide of vanadium (V); and
   an oxide of molybdenum (Mo) and/or tungsten (W), wherein
   on titanium oxide having sulfate ions and aluminum ions adsorbed thereon obtained by making contact with aluminum sulfate at more than 1 wt % and not more than 6 wt % relative to titanium oxide in the presence of water, an oxo acid salt of vanadium or a vanadyl salt and an oxo acid or an oxo acid salt of molybdenum and/or tungsten are supported in a proportion of more than 0 atom % and not more than 3 atom %, respectively.

2. A production method for an exhaust gas purification catalyst comprising titanium oxide ($TiO_2$), aluminum sulfate ($Al_2(SO_4)_3$), an oxide of vanadium (V), and an oxide of molybdenum (Mo) and/or tungsten (W), comprising
   supporting an oxo acid salt of vanadium or a vanadyl salt and an oxo acid or an oxo acid salt of molybdenum and/or tungsten in a proportion of more than 0 atom % and not more than 3 atom %, respectively, onto titanium oxide having sulfate ions and aluminum ions adsorbed thereon obtained by making contact with aluminum sulfate at more than 1 wt % and not more than 6 wt % relative to titanium oxide in the presence of water.

3. A method for purifying nitrogen oxides in exhaust gas, comprising injecting ammonia ($NH_3$) as a reducing agent into the exhaust gas from mono-fuel combustion of biomass or multi-fuel combustion of biomass and coal, followed by contacting the exhaust gas with an exhaust gas purification catalyst according to claim 1 to reduce and remove nitrogen oxides contained in the exhaust gas.

\* \* \* \* \*